United States Patent [19]

Thompson

[11] 4,257,525

[45] Mar. 24, 1981

[54] BOTTLE WITH ATTACHED HANDLE

[76] Inventor: Mortimer S. Thompson, P.O. Box 113, Enfield, Conn. 06082

[21] Appl. No.: 40,864

[22] Filed: May 21, 1979

Related U.S. Application Data

[63] Continuation-in-part of Ser. No. 28,886, Apr. 10, 1979, which is a continuation of Ser. No. 877,603, Feb. 14, 1978, abandoned.

[51] Int. Cl.$^3$ ............................................. B65D 23/10
[52] U.S. Cl. ............................. 215/100 A; 220/94 R
[58] Field of Search ........................... 215/100 A, 101; 220/94 R

[56] References Cited

U.S. PATENT DOCUMENTS

| | | | |
|---|---|---|---|
| 2,268,768 | 1/1942 | Nathanson | 220/94 R |
| 2,705,095 | 3/1955 | Neuman | 215/100 A UX |
| 3,404,795 | 10/1968 | Kemp | 215/100 A |
| 3,524,241 | 8/1970 | Walkup | 215/100 A UX |

*Primary Examiner*—Donald F. Norton
*Attorney, Agent, or Firm*—Morgan, Finnegan, Pine, Foley & Lee

[57] ABSTRACT

A new and unique bottle and attachable handle and method of forming and assembling the same. The bottle includes a recess in its sidewall which provides space for finger placement and means for attaching the handle substantially therewithin. The handle is attached to the sidewall of the bottle at the upper and lower portions of the recess and essentially lies within the breadth of the bottle and preferably substantially within the recess. The handle and bottle can be attached by interlocking, welding, bonding, or adhesive means. For such attachment the handle and bottle have coacting surfaces which provide vertical and horizontal bearing surfaces therebetween for lifting and carrying the bottle and for pouring therefrom.

35 Claims, 29 Drawing Figures

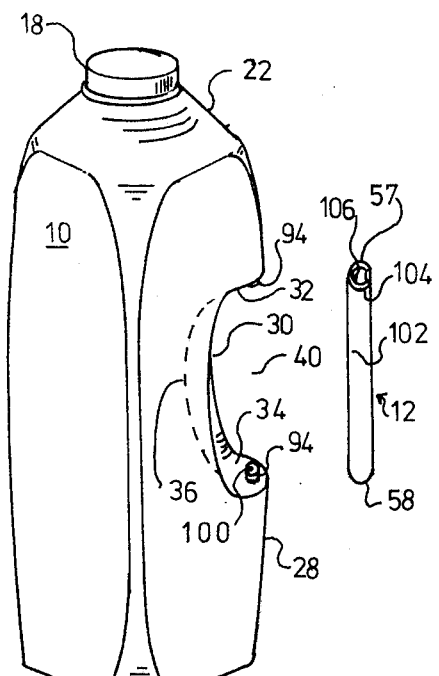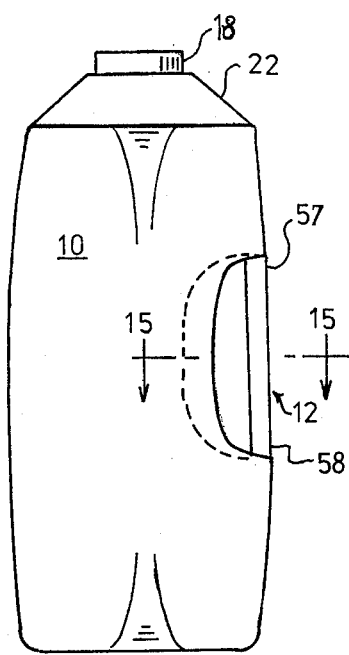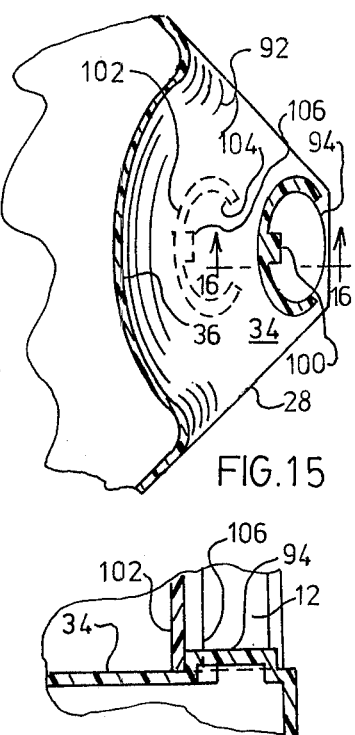

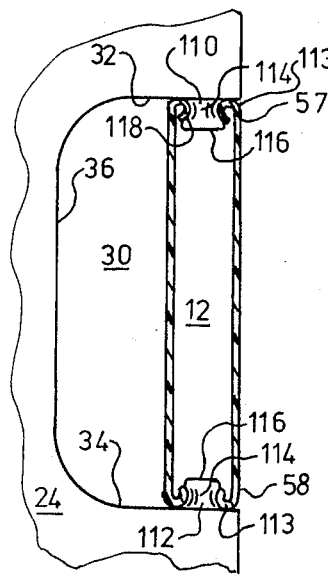
FIG. 20
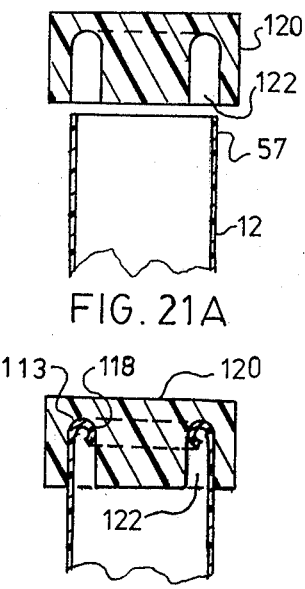
FIG. 21A
FIG. 21B
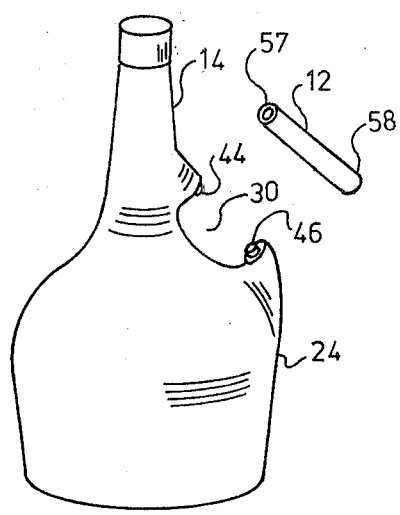
FIG. 22A
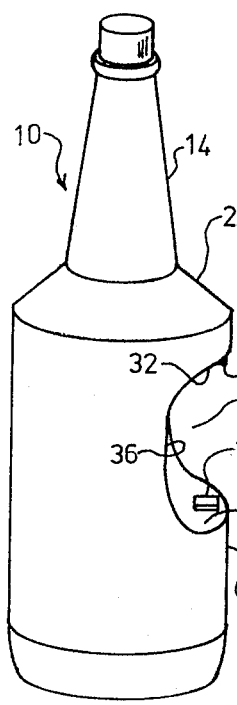
FIG. 23A
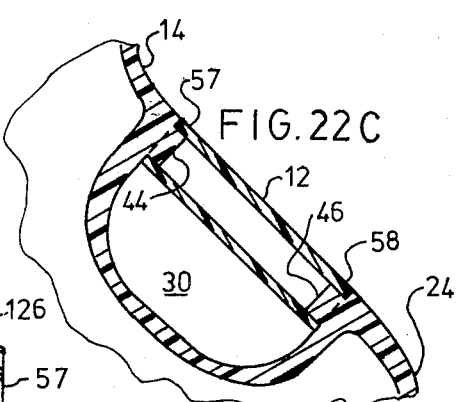
FIG. 22C
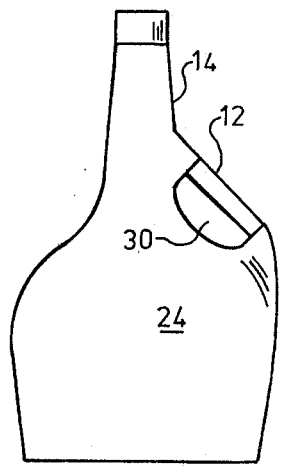
FIG. 22B
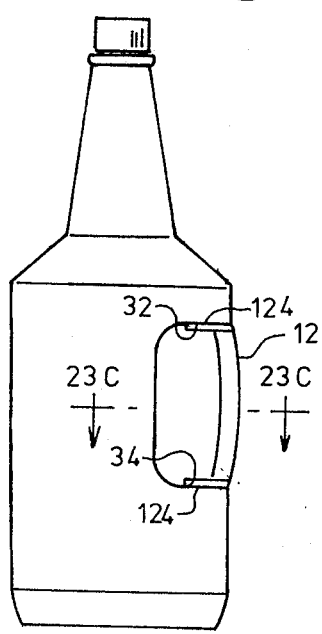
FIG. 23B
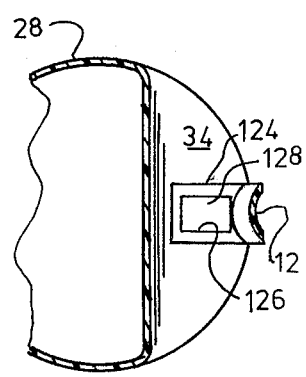
FIG. 23C

BOTTLE WITH ATTACHED HANDLE

This application is a continuation-in-part application of my application Ser. No. 028,886, filed Apr. 10, 1979, which is a continuation application, Ser. No. 877,603, filed Feb. 14, 1978, now abandoned.

FIELD OF THE INVENTION

This invention relates to a bottle having an attached handle and to a method of forming and assembling the same, and particularly to a bottle which includes a recess in its sidewall for attaching a gripping, lifting, carrying and pouring handle thereto.

BACKGROUND OF THE INVENTION

While larger glass and plastic bottles (e.g., 32 ounce, 128 ounce, etc.) with handles are widely used they have drawbacks in manufacture and in use.

With respect to large plastic bottles (e.g., 32 ounce, 64 ounce, 128 ounce, etc.) with handles for lifting, carrying and pouring, they generally are made by the extrusion blow molding process.

In this process an extruder initially forms large diameter preforms, hollow tubes known as parisons, and the parisons are positioned within blow molds having the desired final shape of the bottles. In each blow mold a portion of the parison is pinched off to form a handle shape and the pinched parison is blown to its final bottle dimensions with a hollow handle and an interconnecting web. Thereafter, the web is removed to provide a handle for gripping, lifting, carrying, and pouring.

In forming such hollow handles relatively high plastic temperatures and substantial parison thicknesses are required to provide satisfactory fusion in the pinched and blown parison. Also, the parison must have a large enough diameter so that it will essentially traverse the breadth of the bottle when pinched and blown.

The procedures for forming these bottles are well known. See *Modern Plastics Encyclopedia,* Vol. 54, No. 10A, 1977–1978, McGraw-Hill Publishing Co. (e.g., section on "Blow Molding" at page 230, et seq.; also see section on "Injection Blow Molding" at page 232 et seq.).

Depending on the design, the pinched, blown hollow handle can provide ease in carrying, lifting and pouring, or simply ease in carrying and lifting. In the instance of a pouring handle, moveover, the need to grip the side walls of the container is eliminated. This can result in lighter weight bottles at lower costs. These and other features make the pouring handle very popular for large plastic bottles made from a wide variety of thermoplastic materials including polyolefins (polyethylene) and polypropylene) and polyvinyl chloride.

However, these methods and the resulting bottles with hollow handles do have shortcomings. For example, decreasing the amount of plastic, used to form the bottles, known as "light weighting", is limited in many cases by the need for adequate parison thickness to provide the requisite fusion along the extensive pinched off areas.

Another limitation is that the required large diameter parison produces bottles having wide variations in wall thicknesses, especially at and near the sidewall at the bottom juncture and at the shoulder area—the most vulnerable areas to drop impact and denting forces. This results because the pinch off distributes the parison into thick areas at each end of the pinch off and in very thin areas in the blown bottle at right angles to it.

Further, hollow handles generally are precluded from use in refillable containers, such as may be found in dairy uses. Cleaning and rinsing the interior of such handles is virtually impossible.

Still another limitation is that the relatively high fusion temperatures required to form the pinched off hollow handles cannot be used to form handles in the newer stretch blow molding process for forming plastic bottles. This process differs from the hollow handle blow molding process in that the parison is first stretched and then blown while at temperatures which are much lower than the fusion temperatures, generally within the 100° F. range about $T_g$ (the temperature at which the plastic material passes from the glass phase to the rubber phase). This procedure, which is known as stretch blow molding, or orientation blow molding, is not only replacing earlier blow molding techniques, but is opening up new markets. Advantages of the new procedures are related to the biaxial orientation of the polymeric material. While the parison is at a temperature insufficient to permit free plastic flow it is expanded biaxially to conform with the blow mold. The temperature of operation generally within the 100° F. range immediately above $T_g$ is such that expansion introduces true strain into the material, and this strain is translated into a definable polymer orientation which results in a number of attributes.

Alignment of polymer molecules results in increased tensile strength, as well as increased clarity, increased impact strength, and reduced creep. A vast market for carbonated soft drink containers is a direct result of significantly improved gas barrier properties.

Suitable container materials for stretch-blow molding are substituted and unsubstituted thermoplastic hydrocarbons. Commonly used materials at this time include acrylonitrile, polyvinyl chloride, polyethylene terephthalate, and polypropylene. This newer procedure also is known. See *Modern Plastics Encyclopedia,* Vol. 54, No. 10A, 1977–1978, McGraw-Hill Publishing Co. (e.g., section on "Stretch-Blow Molding" at page 233 et seq.).

The problem with producing plastic containers with handles using the stretch blow processes results from the nature of the process and condition of the plastic at the time it is biaxially oriented. First, it is not possible to produce handles by the aforementioned parison pinch-off technique because the plastic temperature required for suitable molecular orientation is much too low to permit adequate fusion of the plastic. To intially form the handle at elevated temperatures and then to cool to biorientation temperatures before stretching and blowing would yield handles, and substantial other unoriented portions of the container, with inferior containment and other properties. Further, the large diameter parison required for the parison pinch-off technique reduces the amount of desired biorientation.

With respect to producing both plastic and glass bottles with handles, moreover, difficulty has been encountered in locating the handle in other than the uppermost portion of the bottle. To achieve optimum balance when pouring, however, it is more desirable from a handling standpoint to, in most instances, place the handle in a more central position on the sidewall of the bottle. At present only extrusion blow molding processes with their already discussed shortcomings may be used to form such bottles and handles. Glass and other plastic blow molding processes require that the handle be located on the uppermost region of the bottle because the handle must be formed in the mold for the preform or parison before expansion in the blow mold.

Thus, there is a need for new and improved bottles with handles and for new and improved methods for forming and assembling such bottles.

SUMMARY OF THE INVENTION

In accordance with the present invention, there is provided a new and unique bottle and attachable handle. The bottle includes a recess in its sidewall which provides space for finger placement and means for attaching the handle substantially therewithin. The handle is attached to the sidewall of the bottle at the upper and lower portions of the recess and essentially lies within the breadth of the bottle and preferably substantially within the recess. The handle and bottle can be attached by interlocking, welding, bonding or adhesive means. For such attachment the handle and bottle have coacting surfaces which provide vertical and horizontal bearing surfaces therebetween for lifting and carrying the bottle and for pouring therefrom.

In a preferred embodiment the handle is tubular in cross section and is attached within the recess of the bottle by either interlocking or snap-fitting means, or by spin welding the contacting surfaces of the handle and the bottle. Where desired, the tubular handle can be hollow and the attachment means on the bottle can include openings, to thereby provide a hollow, flow-through handle.

The bottle and handle of the invention can include means for temporarily deflecting the bottle and/or handle to facilitate displacement and engagement therebetween. For example, a pleat or notch can be provided in the bottle adjacent one or both of the areas of attachment or in the handle intermediate its ends and preferably on the outside thereof. When the attachment areas on the bottle are deflected outwardly from one another, or when the handle is bent inwardly, clearance is provided between the coacting surfaces on the bottle for readily positioning the handle incident to attachment. In addition, pleats, bellows, or the like can be incorporated about one or both of the attachment areas on the bottle to permit ready deflection and subsequent engagement with the handle. Thereafter the flexible means, such as the pleats and bellows, can be used to constantly urge one or both of the attachment areas on the bottle together to maintain engagement with the handle.

Also, the handle of the present invention does not require any significant additional space and can be filled, packaged, displayed and stored without extra handling. By lying substantially within the breadth of the bottle and preferably within the recess of the bottle, the handle of the present invention is a space saver and allows filling, packaging, displaying and storing of a bottle without difficulty.

In this invention, moreover, the recess along the sidewall of the bottle is provided for optimum pouring and handling balance for achieving the desired bottle style.

Another feature of this invention is that the described bottles and handles can be formed on existing machinery and equipment.

The glass bottles of the present invention can be produced by blow molding, and the plastic bottles can be produced by injection or extrusion blow molding or by extrusion or injection stretch blow molding.

The handles for the present invention can be formed by extrusion or injection molding. Furthermore, the attachable handles of the present invention can be made from materials which provide desired handle properties, such as stiffness and which minimize cost, including polystyrene, high density polyethylene, polypropylene, polyethylene terephthalate and lower cost, reclaimed lots of such materials. They can be made from the same or dissimilar materials than the bottles to which they are attached.

In addition to the processes of the invention already described for the formation and assembly of the bottles and handles, such processes include placing the handle within the desired mold for the bottle, and blow molding the bottle so that the attachment sites of the bottle coact with the handle to secure it to the bottle while both are in the mold. Also, the processes of the invention can provide a bottle and handle particularly adapted to remain in engagement with each other even during "ovaling" when the bottle is squeezed. For example, the bottle can be formed with opposing projections within its recess, wherein the projections have enlarged heads, and a tubular handle can be formed with ends having an inwardly turned rims of a complementary cross sectional shape. In assembly the handle rims are snapped onto the projections, and will remain in interlocking engagement with the projections of the bottle even during ovaling.

Other and additional embodiments of the bottles and handles of the invention and methods of forming and assembling such bottles and handles will become apparent from the following illustrative embodiments and from the accompanying claims.

DESCRIPTION OF ILLUSTRATIVE EMBODIMENTS OF THE INVENTION

The following is a detailed description together with accompanying drawings of illustrative embodiments of the invention. It is to be understood that the invention is capable of modification and variation apparent to those skilled in the art within the spirit and scope of the invention.

In the drawings:

FIG. 13 is a side elevational view of a milk bottle and handle of the present invention prior to attachment;

FIG. 14 is a side elevational view of the bottle and handle of FIG. 13 with the handle attached to the bottle;

FIG. 15 is a sectional view of FIG. 14, taken along the lines 15—15, which also shows the handle prior to attachment in phantom;

FIG. 16 is a sectional view of FIG. 15, taken along the lines 16—16 thereof;

FIG. 17 is a side elevational view of a dishwashing detergent bottle and handle of the present invention prior to attachment;

FIG. 18 is a side elevational view of the bottle and handle of FIG. 17 illustrating the attachment of the handle and bottle;

FIG. 19 is an enlarged detail view, in section, of a portion of FIG. 18 showing the attachment of the handle to the bottle;

FIG. 20 is a side elevational view illustrating still another embodiment of the attachment means between the handle and the bottle of the invention;

FIGS. 21A and 21B illustrate a preferred method for forming the ends of the handle of FIG. 20;

FIG. 22A is a side elevational view of a wine bottle and the handle prior to attachment to the upper portion of the bottle;

FIG. 22B is a side elevational view of the wine bottle and handle of FIG. 22A with the handle attached to the bottle;

FIG. 22C is an enlarged detail view, in section, of the attachment of the handle to the wine bottle;

FIG. 23A is a side elevational view of a bleach bottle and the handle prior to attachment.

FIG. 23B is a side elevational view of the bleach bottle and handle of FIG. 23A with the handle attached to the bottle; and FIG. 23C is a sectional view of FIG. 23B taken along the lines 23C—23C thereof.

Figure 1:
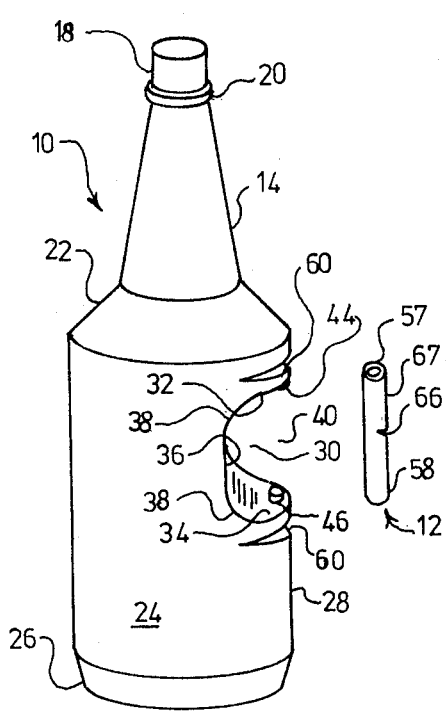
FIG. 1 is a side elevational view of a liquor bottle and handle of the present invention prior to the attachment.
Figure 2:
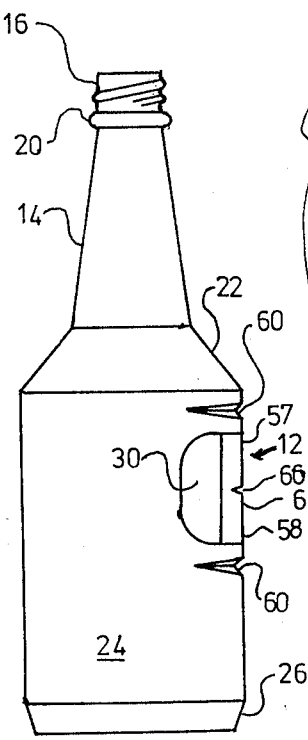
FIG. 2 is a side elevational view of the bottle and handle of FIG. 1 illustrating the attachment of the handle to the bottle.
Figure 3:
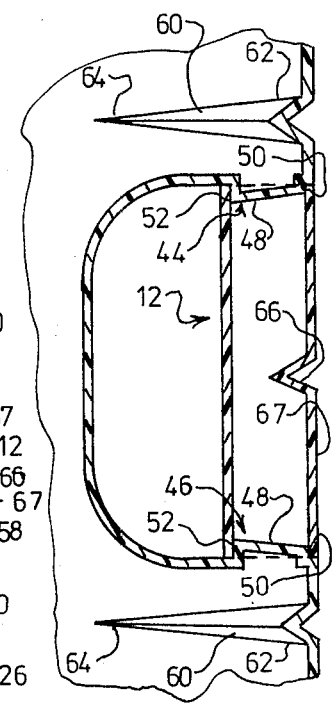
FIG. 3 is an enlarged detail view, in section, of a portion of FIG. 2 showing the attachment of the handle to the bottle.
Figure 4:
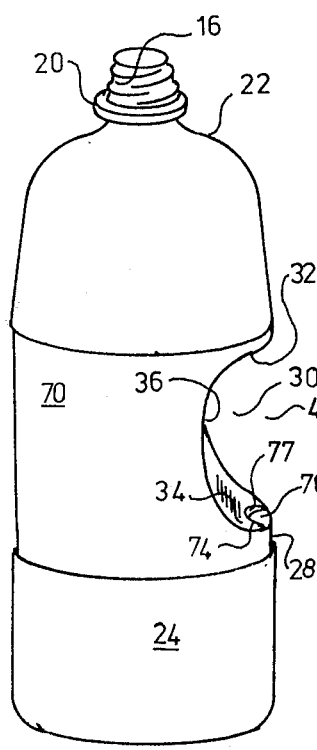
FIG. 4 is a side elevational view of a soft drink bottle and handle of the present invention prior to attachment.
Figure 5:
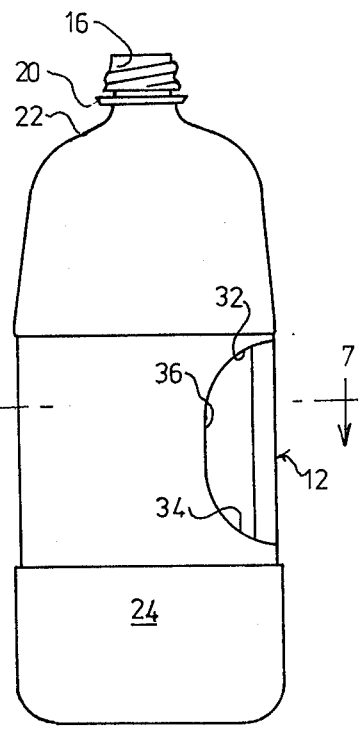
FIG. 5 is a side elevational view of the bottle and handle of FIG. 4 showing the attachment of the handle to the bottle.
Figure 6:
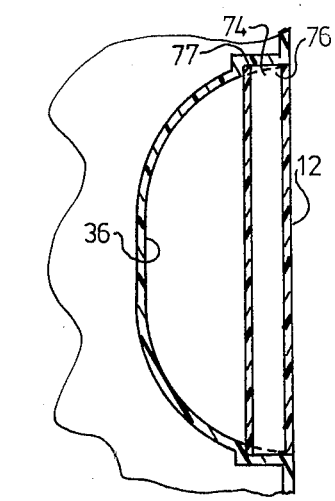
FIG. 6 is an enlarged detail view, in section, of a portion of FIG. 5 showing the attachment of the handle to the bottle.
Figure 7:
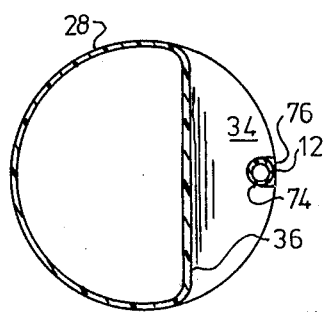
FIG. 7 is a sectional view of FIG. 5, taken along the lines 7—7 thereof.
Figure 8:
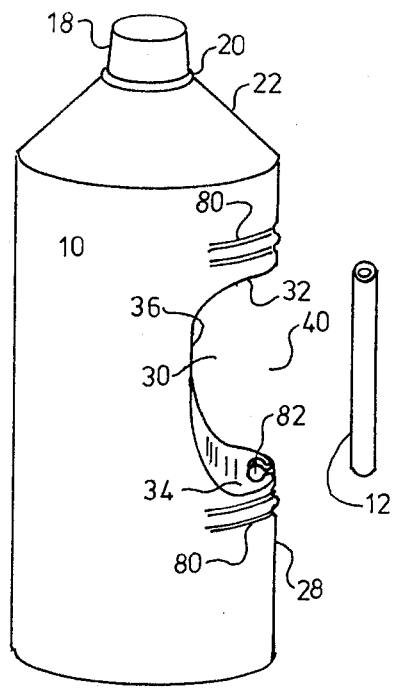
FIG. 8 is a side elevational view of a laundry detergent bottle and handle of the present invention prior to attachment.
Figure 9:
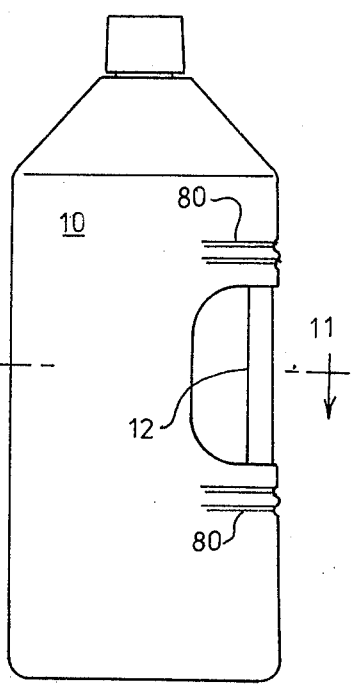
FIG. 9 is a side elevational view of the bottle and handle of FIG. 8 showing the attachment of the handle to the bottle.
Figure 10:
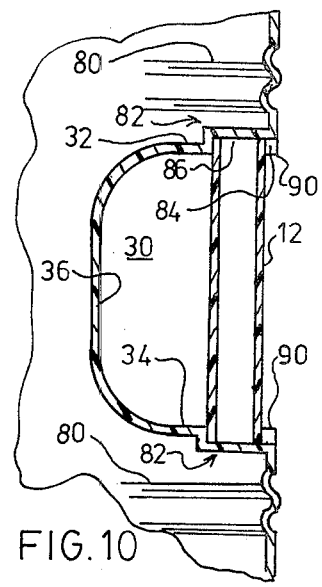
FIG. 10 is an enlarged detail view, in section, of a portion of FIG. 9 showing the attachment of the handle to the bottle.
Figure 11:
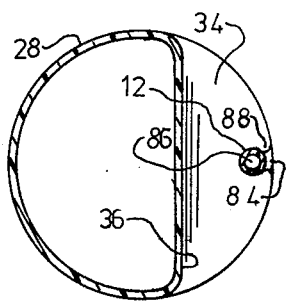
FIG. 11 is a sectional view of FIG. 9, taken along the lines 11—11 thereof.

Referring first to FIGS. 1-3, there is shown a liquor bottle 10 and handle 12 of the present invention.

The bottle 10 can be formed from glass or plastic by blow molding, and includes a relatively narrow neck 14 with a threaded finish 16 (see FIG. 2) for a closure cap 18 (see FIG. 1), and a ring 20 immediately below the finish 16. In this embodiment the neck 14 extends from below the ring 20 to a shoulder 22. The shoulder 22 is tapered outwardly and interconnects the neck 14 to the body 24 of the bottle 10 which can have a breadth from about 2 to about 5 times greater than the breadth of the neck finish 16.

In the sidewall 28 of the bottle 10 between the neck finish 16 and the base 26 (and as illustrated, in the body 24) is a recess 30. The recess 30 has a longitudinal axis which is parallel to the longitudinal axis of the bottle 10, and is large enough to allow for comfortable finger placement for gripping the handle 12. The recess 30 includes a top wall 32 and bottom wall 34 which are substantially horizontal and a substantially vertical back wall 36. The walls 32 and 34 are connected to the wall 36 by curvilinear portions 38. At the outer ends of the walls 32 and 34 the recess 30 has an open front end 40.

Interlocking means which, in this embodiment, are opposing projections 44 and 46 extend into the open recess end 40. Each projection 44 and 46 is generally circular in cross section and includes a top 48 which is inclined inwardly, and outer and inner sides 50 and 52 for attachment of the handle 12.

The handle 12 is a straight hollow tube, circular in cross section. The handle 12 is open at each end 57 and 58 and is of a diameter which allows the ends to fit snugly over and in engagement with the projections 44 and 46 to lock the handle 12 to the bottle 10.

In this, and other illustrative embodiments of the invention, moreover, the engaging and contacting portions of the recess walls 32 and 34 (projections 44 and 46 and handle ends 57 and 58) coact to provide ample vertical and horizontal bearing surfaces for lifting, carrying and pouring by gripping the handle 12.

Immediately above and below the projections 44 and 46 in the sidewall are pleats 60 with their wider ends 62 adjacent the recess open end 40 and their apex ends 64 adjacent the back wall 36. The pleats 60 allow flexing of the walls 32 and 34 outwardly from one another for ease of handle attachment.

As illustrated the handle or tube 12 also includes a notch 66 in the central portion of its outer wall 67. The notch 66 in the outer wall 67 provides maximum flexibility of the central portion of the tube 12 inwardly while providing maximum rigidity outwardly when gripped.

In these drawings pleats and notches have been shown both in the bottle 10 and in the handle 12. In practice, the notch, pleat or other deflecting means, generally will be provided in either one of these components of the invention. For example, where the bottle is glass the handle 12 can be of a resilient plastic and can contain the notch or pleat, and where the bottle is plastic that is flexible or resilient the pleat[s] or notch[es] can be in the bottle and the handle can be a rigid member.

To assemble the bottle 10 and handle 12, the bottle 10 can be temporarily deflected outwardly from one another at the recess 30, or the center of the handle 12 can be deflected inwardly, or both, and the engaging open ends 57 and 58 of the handle 12 are snapped over and onto the projections 44 and 46. As shown in FIGS. 2 and 3 the attached handle 12 lies within the recess 30 and its outer wall 67 is continuous with the sidewall 28.

Ample room is provided between the handle 12 and the backwall 36 of the recess 30 for easy finger placement incident to gripping, lifting and carrying the bottle 10 by the handle 12, and for readily pouring from the bottle 10 while gripping the handle 12.

Referring to other embodiments of the invention which now will be described, like reference numbers refer to like parts of the bottle and handle that already have been described.

In FIGS. 4-7, the bottle 10 is formed from biaxially orientible thermoplastic materials and is made by the stretch-blowing process to provide a biaxially oriented, pressurized plastic container having a highly engineered and functional shape, particularly well suited for containing carbonated beverages.

The neck finish 16 terminates at the ring 20 with the tapered shoulder 22 depending therefrom to the body 24. About the central portion of the body 24 is an annular depression 70 for a label or the like.

In the sidewall 28 and within the depression 70 is the recess 30. In its top and bottom recess walls 34 and 36, and at the open forward recess end 40, are slots 74. Each slot 74 has an entrance way 76 shaped to receive the tubular handle ends 57 and 58, and a semicircular shaped shoulder 77 against which handle ends 57 and 58 abut.

In this instance, the handle 12 is pressed into the slots 74 and against the shoulders 77. The handle then can be fixed in place by welding, bonding or adhesive techniques.

For example, the handle 12 can be secured in position by spin welding. This is achieved by rotating the handle 12 at high speeds to generate high frictional heat between the contacting surfaces of the bottle 10 and tubular handle ends 57 and 58 in a short period of time so that when the rotation is stopped the handle 12 fuses to the bottle 10 at the contacting attachment sites (slots 74 and handle ends 57 and 58). The slots 74 on the bottle 10 locate and confine the handle 12 in such a way that the rotating handle ends 57 and 58 do not move from a specific track and the generated frictional heat is not dissipated over any but the actual bonding surfaces. This produces an efficiently directed, quickly generated heat on the surfaces of the attachment sites, the source of which is cut off immediately when the surfaces are at a high enough temperature to effect fusion. This avoids diffusion of the heat through the wall thickness of the bottle 10 which can occur with a slow heat buildup and which can reduce physical properties, produce opacity in crystalline polymers and distort or rupture the bottle 10. The quick surface heating of only a very thin layer of the bottle 10 sufficient to provide fusion avoids these detrimental drawbacks. Thus, the provision of a "track" on the bottle surface at the attachment sites (slots 74) for the handle 12 (tubular ends 57 and 58) provides a concentrated sliding friction which is important to the successful securing of the handle 12 to the bottle 10 by spin welding.

Preferably the handle 12 also is slightly oversized in length and spans the recess opened end 40 so that pressure must be applied to the handle ends 57 and 58 to press fit them into the slots 74, thereby providing further surface contact where frictional heat may be developed quickly for fusing the handle 12 to the bottle 10.

Referring to FIGS. 8-11 there is shown a blow molded plastic laundry detergent bottle 10 and tubular handle 12. In this embodiment the bottle 12 has bellows 80 formed in the sidewall 28 immediately above and below the attachment means or sites for the bottle 10. Here the opposing attachment means in the top and bottom recess walls 32 and 34 each include keyhole shaped grooves 82, each having an access 84 and circular slots 86.

In assembling the bottle 10 and handle 12, the handle ends 57 and 58 are ovalized and inserted through the keyhole accesses 84 into the circular slots 86 where the handle ends 57 and 58 return to their circular shape abutting the walls of the slots 86.

Figure 12:
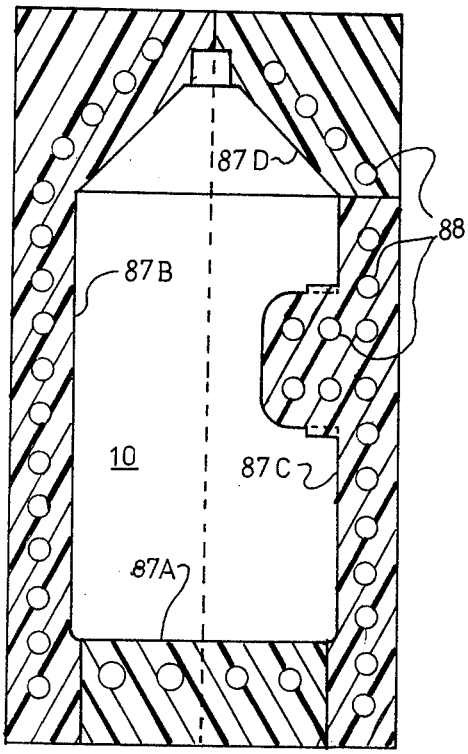
FIGS. 12A-12B are side elevational views of the detergent bottle of FIG. 8 showing its formation and removal from a blow mold.
Figure 12:
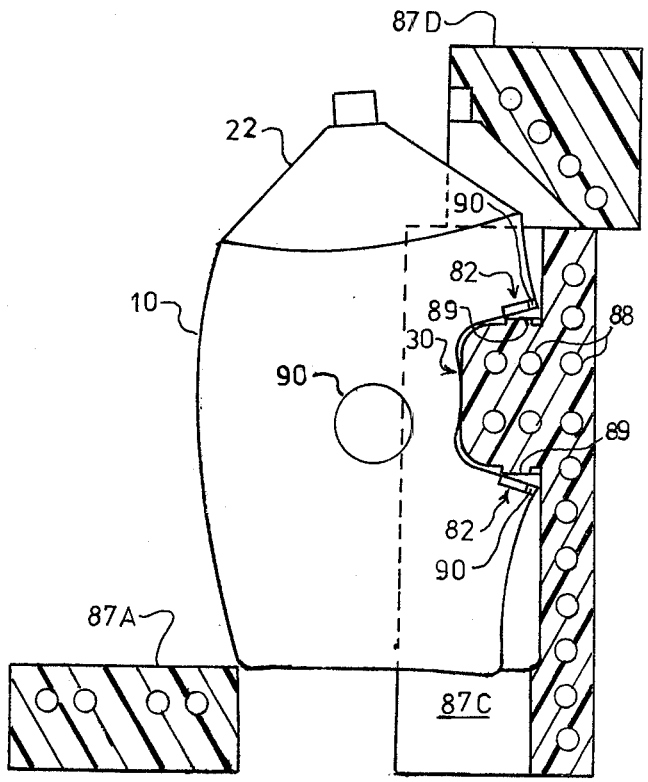

FIGS. 12A and 12B show how the ability of certain bottle shapes to be ovalized can be useful in implementing certain embodiments such as that shown by FIGS. 8-11. The keyhole shaped groove 82 is impossible to fabricate using a typical two piece mold since the mold action would strip away the walls of access 90. Further, in the recess area movable mold parts to form the grooves 82 would detract from the mold cooling efficiency in a critical cooling location.

In FIGS. 12A-12B there is shown a mold construction which retains the mold cooling channels while permitting easy removal of bottle 10. The mold consists of four parts: a base 87a which remains stationary; a mold half 87b which forms the bottle half away from the recess 30; a mold part 87c which forms the recess 30 and grooves 82, and contains cooling channels 88; and an upper mold part 87d which forms the shoulder 22 and neck finish 14 above the recess 30. After the bottle 10 is formed mold half 87b and mold parts 87c and 87d open in opposing directions. However, bottle 10 remains affixed or interlocked to mold part 87c by virtue of the groove forming projections 89.

When the mold parts 87a-87d are fully open, upper mold part 87d and mold base 87a are displaced from bottle 10 so that when ovalizing occurs the bottle 10 is free to move upwardly and downwardly releasing the bottle from the mold part 87c (see FIG. 12B). Ovalizing is accomplished by squeezing the bottle 10 at a location normal to the recess 30 with opposing plungers 90 (only one of which is shown). Thereafter, the plungers 90 move the bottle 10 laterally out of the mold 87a-87d.

Thus, this mold construction allows the formation of attachment sites which, by virtue of their configuration, interlock with the mold, but which, after formation, can readily be released from the mold without damage.

In FIGS. 13-16, there is illustrated a plastic blow molded milk bottle 10 and gripping, lifting, carrying and pouring handle 12.

In this embodiment the recess 30 is concave in the vertical and horizontal planes for greater bottle capacity and for columnar stresses imposed by stacking loads. In other words the back wall 36 has a concave shape along its length (the normally vertical or longitudinal direction of the bottle 10) and a concave shape in cross section (the normally horizontal direction of the bottle 10). To spread loading stresses along its cross section, the ends 92 of the concave cross sectional shape are rounded to form reverse curvilinear segments which tangentially extend into the sidewall 28.

Also, in this embodiment the interlocking means for securing the handle includes opposing elliptical projections 94 that extend from the outer ends of the walls 32 and 34 into the open end 40 of the recess 30. Each projection 94 includes a keyway or slot 100 in the central portion of its inner wall for aligning and securing the handle 12 thereto (see particularly FIG. 15).

The handle 12 has a complementary elliptical cross sectional shape. It is a hollow tubular member 102 which is open along its length to form a slit with resilient arms 104 and tongues or keys 106 that extend from the central portion of the resilient tube wall 102 at each end 57 and 58 thereof for engagement with the corresponding keyways 100. Further, the inwardly facing tubular wall of the member 102 has a curvilinear shape for easy finger placement and comfortable gripping.

In assembling the handle 12 to the bottle 10, the handle 12 is first press fitted into the recess 30 immediately behind the projections 94 and then moved toward the open recess end 40 so that its inwardly turned gripping arm ends 57 and 58 are in contact with the projections 94 and the keys 106 are in general alignment with the keyways 100. Continuation of such movement causes the contacting, inwardly turned gripping arm ends 57 and 58 to be deflected outwardly or open by, and then about the projections 94 until they snap and lock thereonto with the keys 106 and keyways 100.

Alignment between the handle ends 57 and 58 and projections 94 may be achieved by rotating slightly the handle 12 as it is being moved into locking engagement until the keys 106 engage the keyways 100. Once the handle 12 is press fitted and locked onto the projections 92 it will remain in position with the assistance of the interlocking keys 106 and keyways 100.

The handle 12 now can be gripped for lifting, carrying and pouring from the bottle 10.

As shown in FIGS. 17-19 the handle 12 has been adapted for use in a plastic blow molded dishwashing detergent bottle 10.

For optimum handling and pouring the recess 30 and handle 12 in this embodiment span the upper portion of the bottle 10 extending from just below the neck area to the middle portion of the bottle body 24. The recess 30 is at an acute angle to the longitudinal axis of the bottle 10 and the upper projection 44 is spaced inwardly from the lower projection 46. Both projections 44 and 46 are an acute angle to the longitudinal axis of the bottle 10 with the projection 44 being at a greater acute angle. By so positioning the recess 30 and projections 44 and 46, the flexible tubular handle 12 is bowed and is at an acute angle with respect to the longitudinal axis of the bottle 10.

To facilitate engaging and holding the handle ends 57 and 58 on the projections 44 and 46, bellows 80 are provided in the sidewall 28 of the bottle 10 immediately above and below the recess 30. The length of handle 12 may be longer than the span between projections 44 and 46 to provide a residual compressive force on handle ends 57 and 58.

In this embodiment there also is shown bores 109 which extend through the projections 44 and 46 to provide a flow through handle 12. These bores 109 can be formed in making the detergent bottle 10 or can be formed thereafter, such as by punching holes in the projections 44 and 46. Enhanced assurance of a liquid tight seal between handle ends 57 and 58 and projections 44 and 46 is accomplished by spinwelding or other bonding or adhesive means.

Thus, in this instance, liquid in the bottle 10, such as a detergent, can freely flow through the attached handle 12.

Referring now to FIG. 20 there is illustrated an embodiment of the attachment between the handle 12 and the bottle 10 where a substantial amount of "ovaling" may occur without causing the handle 12 to become disengaged.

Ovaling can occur when a substantially cylindrical flexible plastic bottle 10 is squeezed normal to the handle 12. Depending upon where the bottle 10 is squeezed ovaling can cause one end of the handle 12 to move relative to the other end to such an extent that the one end can become disengaged from the bottle.

As shown, to avoid such disengagement of the interlocking means, in this illustrative embodiment projections in the form of buttons 110 and 112, and the ends 57 and 58 of the hollow tubular handle 12 include engaging annular rims 113.

The buttons 110 and 112 extend from the upper and lower walls 32 and 34 into the recess open end 40. Each button 110 and 112 includes a stem 114 and an enlarged head 116.

The annular rims 113 are formed by turning the ends 57 and 58 of the handle 12 inwardly so that the inside periphery 118 of rims 113 have the same shape as the outside periphery of buttons 110 and 112. To secure the handle 12 to the bottle 10 the rims 113 are snapped onto the buttons 110 and 112. In view of the depth and configuration of the interlocking means (buttons 110 and 112 and rims 113), the handle will remain in locking engagement with the bottle even during ovaling.

In FIGS. 21A and 21B there is shown one method for forming the rims 113 in the ends 57 and 58 of the tubular handle 12. As shown in these figures a heated fixture 120 having a doughnut shaped forming groove 122 is brought into contact with the handle end 57 (or 58) under pressure. By maintaining such engagement the tubular end 57 will turn inwardly to form the rim 113 within the heating groove 122 as shown in FIG. 21B.

In FIGS. 22A-22C there is illustrated wine bottle 10 of glass having its recess 30 in the neck portion 14 and adjoining body portion 24 thereof. Here the recess 30 is at an acute angle to the longitudinal axis of the bottle 10 to facilitate gripping, carrying and pouring. As in the other embodiments of the invention a plastic handle 12 is snapped onto the projections 44 and 46 at its ends 57 and 58.

Referring now to FIGS. 23A-23C there is illustrated an injection molded handle 12 having a semi-circular cross section. The handle 12 includes lateral rectangular extensions 124 at the ends 57 and 58 thereof which contain slots 126.

Correspondingly the recess 30 of the bottle 10 includes keys 128 extending from the recess walls 32 and 34.

To assemble the handle 12 to the bottle 10 the extensions 124 are pressed toward each other to clear and snap over the keys 128. As shown in FIG. 23B, the handle 12 can be bowed slightly to place the handle 12 under tension and thereby provide added security for attachment. Also this embodiment resists disengagement of handle 12 during "ovaling" due to the spring action of the handle ends 124 which maintains engagement of the slots 126 with the keys 128.

With respect to the bottles and attachable handles of the present invention, they can be used to contain and pour a wide variety of pourable products. These include:

beverages, such as carbonated drinks, fruit juices and drinks, liquor, beer, wine and milk;
foods, such as edible oils, pourable dressings and vinegar;
medicinal and health products, such as oral anticeptics;
toiletries and cosmetics, such as shampoo and hair care products;
household chemicals, such as general purpose and dishwashing detergents and bleaches; and
auto and marine products, such as motor oil and antifreeze.

With respect to producing glass bottles 10 of the invention they can be formed by any of the several techniques, including blow and blow and press and blow techniques.

In the blow and blow technique a glob of molten glass is fed into a parison mold where the neck finish and parison is formed by blowing air pressure within the glob to force the molten glass against the neck finish to fully define such finish and form the preform. The parison is then transferred to a blow mold having the finish bottle shape and the preform is expanded to the walls of the mold by internally feeding gas under pressure therewithin.

In the press and blow technique an internal mandrel is used to form the neck finish and preform and thereafter the parison is transferred to the blow mold in which the final shape of the bottle is formed as has just been described.

With respect to producing the plastic bottles 10 of the invention, they can be formed by any of several molding techniques, including extrusion blow-molding and injection blow molding. However, stretch blow-molding is preferred because of the desirable properties of biaxially oriented plastic bottles formed by this technique.

In the stretch blow-molding process biaxial orientation of the polymeric materials only can occur over a range of temperatures within which some part of the stress applied during blowing produces strain in the polymer. It has been indicated that this requirement is met in many polymer materials if blowing is carried out within a finite temperature range above $T_g$. For these purposes, $T_g$ is assigned its conventional meaning of the temperature representing the transition from the glass phase to the rubber phase produced upon heating of the polymer. An acceptable range for biorientation—i.e., for stretch blow molding in the usual case, does not exceed 100° F. above $T_g$ for amorphous polymers. Crystalline polymers, such as polypropylene are processed at temperatures slightly below their crystaline melting point, $T_c$. To a significant extent, the degree of biorientation and, in consequence, the improvement in physical properties attendant upon this parameter increases for a given degree of expansion as temperature is decreased. A significant improvement in properties is generally found to result in those procedures in which the average wall thickness is reduced by a factor of at least two, while the plastic is at a temperature within 100° F. or preferably 50° F. above $T_g$. This is considered to be preferred from the standpoint of stretch blow molding, per se, and in similar fashion is considered to define a preferred embodiment in accordance with the invention.

With respect to materials for forming the bottles, these include those satisfactory for blow-molding or those satisfactory for the preferred embodiments of stretch blow molding. Both contemplate polymeric materials which at least during the blowing operation are thermoplastic. Compositionally, polymer (or plastic) material satisfactory for use are hydrocarbons or substituted hydrocarbons. Materials include the simple unsubstituted homopolymers, polypropylene and polystyrene, substituted polymers, such as, acrylonitriles, and polyesters, such as polyethylene terephthalate.

With respect to producing the handle 12 of the invention, they also can be formed by known techniques including extrusion injection molding and compression or transfer molding. In the preferred embodiment, however the handle 12 is formed by injection molding.

As has been described, the handles 12 can be attached to the bottles 10 by snap or interlocking means, or by bonding, welding, or adhesive means.

In FIGS. 1–3, 8–12, 13–16, 17–19, 20, 22A–22C and 23A–23C, various snap fit and interlocking means have been illustrated.

Alternatively, the handles 12 can be attached to the bottles 10 by a variety of bonding techniques. (See FIGS. 4–7). These bonding techniques including welding operations generally accomplished by frictional heating, as by spin welding or by other procedures in which contacting surfaces are placed in relative movement. Vibration may be at sufficiently high frequency and producing sufficient frictional heat to result in ultrasonic welding. A variety of alternative heating means may utilize external fields: magnetic, electric, or electromagnetic. As ordinarily practiced, electromagnetic welding, induction welding, as well as radiation welding may make use of intrinsic properties of the plastic material or may depend upon fillers which are designed to convert field energy to thermal energy. Such fillers may take the form of magnetically or electrically polar particles or may have larger absorption cross-section for radiation.

An expeditious form of bonding may involve chemical modification of the plastic, for example, by cross-linking. This cross-linking or curing which may be induced by radiation of suitable quantum energy may result from polymer cross-linking, for example, by inclusion of a difunctional curing medium—or for that matter, by any medium of greater polyfunctionality.

Local conductive heating is generally not preferred, particularly as practiced in stretch blow molding, since excessive heat conducted through the stretched sidewall results in degradation of those properties dependent upon biaxial orientation and release of orientation stress may result in collapse of the sidewall, possibly with its rupture. However, the handle shown in FIGS. 4–7 represents a valuable embodiment in accordance with the invention which enables the use of local conductive heating. In this case, the handle extremity possesses a very thin section abutting the sidewall of the bottle. This section can be heated sufficiently to fuse itself to the sidewall without generating sufficient heat content to substantially effect a deterioration of the thicker sidewall of the bottle.

In some instances, bonding of the handles 12 to the bottles 10 can be achieved through the use of adhesives, such as can be achieved with water-based, solvent-based or other adhesives which cure at ambient conditions.

With respect to materials for forming the handles, these include the same materials used for forming the bottles. Inasmuch as the handles are formed separately these materials can be dissimilar to those of the bottles and can be specifically selected to maximize the properties of the handles, such as resiliency, toughness and stiffness. For example, impact polystyrene handles would provide suitably high levels of toughness, stiffness, close dimensional tolerances for optimum performance during attachment and use to a variety of bottles made from polyethylene, polypropylene, polyethylene, terephthalate, etc.

In addition, where desired these handles can be of a different color than the bottle. Also the handle can be formed from scrap materials that otherwise may be disposed of because such materials may not be suited for contact the contents to be contained.

Furthermore, it is within the scope of this invention to select and combine features of the various embodiments thereof. With respect to the illustrative embodiments, for example:

The engagement of the tubular handle 12 with projections 44, 46 of FIGS. 1–3 may be further secured against separation and may be made liquid or pressure tight by combining the spin welding technique used for engagement in FIGS. 4–7 or by the use of adhesives;

The three-dimensional recess 30 of FIGS. 13–16 may be used with the beverage bottle of FIGS. 4–7;

The flexing means (pleats 60 and bellows 80), which constantly urge the interlocking means between the handle 12 and bottle 10, can be used for bottles where substantial ovaling may be present because such means will maintain the desired interlocking engagement.

Ovaling of the certain bottle shapes can be used to facilitate engagement of the handle 12 to projections 44, 46 in the embodiment shown in FIGS. 1-3 or FIGS. 17-19 which can be followed by spin welding;

Also, spin welding of the handle 12 of FIGS. 4-7, or other hot bonding techniques, can be accomplished after the bottle 10 is filled to provide a heat sink to protect the bottle sidewall from the deliterious effects of high temperature.

With respect to terms herein, they have been used in their conventional sense. For example, as described above, particularly useful embodiments depend upon extrusion or injection molding to produce a preform and stretch blow molding to produce the final bottle. These and other terms used in the description are briefly defined:

Plastic: a category of organic materials, generally thermoplastic, substituted or unsubstituted, hydrocarbons—examples are polyolefin, such as polypropylene, and polyesters, such as polyethylene terephthalate.

$T_c$: (glass transition) temperature at which the plastic changes from a glassy state to a rubbery state. Molding operations are invariably carried out substantially above $T_c$—generally at temperatures at least 100° F. in excess. Preferred embodiments herein which depend upon biaxial orientation are carried out with the plastic in the rubbery state but over a lower range, generally with 100° F. of $T_c$.

Molding: that category of procedures in which plastic material is caused to flow into the interstices of the mold to result in a formed object which becomes rigid upon cooling.

Preform: (occasionally referred to as parison) the molded form which, in the procedure of the invention, is formed preliminary to expansion to produce the final object and, therefore, a form somewhat smaller than that of the final object. As generally contemplated, the preform is produced with the plastic at an elevated temperature in excess of 100° F. above $T_c$.

Extrusion molding: that molding procedure generally utilized to produce the preform or parison. In the usual commercial process, plastic materials introduced as particulate matter by a screw or ram with or without external heating is brought to elevated temperature so that it is introduced as a flowing plastic under pressure through a die to produce the preform.

Injection molding: that molding procedure generally utilized to produce the preform. In the usual commercial process, plastic materials introduced as particulate matter by a screw or ram with or without external heating is brought to elevated temperature so that it is introduced as a flowing plastic under pressure into a mold to produce the preform. Connecting passages known as runners are common.

Compression or Transfer molding: One of the more common alternatives to injection molding to produce the handle in which a mass of plastic is heated and is introduced into a mold portion. Whereafter, an additional mold portion, such as a plunger, distorts the mass to cause it to conform, again, with the interstices of the now completed mold.

Blow molding: This term contemplates expansion of the preform to its final configuration by the use of gas under pressure. This requires use of blow mold. As practiced in the past, no effort was made to change the temperature of the preformed plastic before or during the blowing operation. Some reduction in temperature naturally results from contact with the preform.

Stretch blow molding: Blow molding in which the preform is stretched often by means of an inserted plunger prior to blowing. The procedure is recognized as advantageously practiced with the plastic material within a temperature range close to but above $T_g$ so as to result in extension of the polymer molecules from their natural state to an extended state with the major molecular axis as resolved lying in the direction of stretch. Blowing is carried out within the same temperature range designed to result in retained orientation and produces orientation in the blow direction so that the resulting final configuration is "biaxially oriented".

The invention in its broader aspect is not limited to the specific described embodiments and departures may be made therefrom within the scope of the accompanying claims without departing from the principals of the invention and without sacrificing its chief advantages.

I claim:

1. A bottle having a neck finish at one end, a base at its other end and a sidewall therebetween, comprising:
   a recess in said sidewall which forms a space for finger placement in said sidewall and within said recess, and,
   attachment means on said sidewall at said recess receiving a handle having attachment means thereon which coact with said recess attachment means to secure said handle to said bottle said handle extending essentially within and bridging said recess and about which finger placement can occur within said recess for lifting, carrying and pouring from the bottle by gripping said attached handle.

2. The bottle of claim 1, wherein said bottle and handle attachment means include engaging bearing surfaces which permit lifting and carrying and pouring from the bottle by gripping said handle.

3. The bottle and handle of claim 1, wherein said bottle and handle attachment means include interlocking means.

4. The bottle of claim 1, wherein said bottle comprises glass.

5. The bottle of claim 1, wherein said bottle comprises a plastic material.

6. The bottle of claim 1, wherein said bottle comprises a biaxially oriented thermoplastic material.

7. The bottle and handle of claim 1, wherein said bottle and handle attachment means include snap fitting means.

8. The bottle and handle of claim 1, wherein said bottle and handle attachment means include bonding means.

9. The bottle and handle of claim 1, wherein said bottle and handle attachment means include welding means.

10. The bottle and handle of claim 1, wherein said bottle and handle attachment means includes adhesive means.

11. A bottle having a neck finish at one end, a base at its other end and a sidewall therebetween, comprising:
   a recess in said sidewall being open at said sidewall, and having a back wall, and upper and lower walls which form a space for finger placement through said opening, attachment means on said upper and lower recess walls, and a handle positioned essentially within the breadth of the bottle having attachment means which coact with said attachment means on said upper and lower recess walls to secure said handle to said bottle, and about which finger placement can occur within said recess for gripping the handle, and wherein said attachment means on said recess walls and handle have contacting horizontal and vertical bearing surfaces therebetween which allow the bottle to be lifted, carried and poured from by gripping said handle.

12. The bottle of claim 11, wherein said attachment means on said upper and lower recess walls includes projections at the opening of said recess which extend thereinto, and wherein said handle is a hollow tube which is secured to said projections by press-fitting the hollow ends of said handle onto said projections.

13. The bottle of claim 12 wherein said projections are buttons, each of which includes an enlarged head and a stem integral with said recess wall, and wherein said hollow tube includes annular rims at the ends thereof which are snap fitted onto and in locking engagement with said buttons.

14. The bottle of claim 11, wherein said attachment means includes slots having curvilinear shoulders in said upper and lower walls at the opening of said recess, and said handle is tubular with ends that slidably fit into said slots against said shoulders and are secured therewithin.

15. The bottle of claim 11, wherein said handle is secured to said attachment means at least in part by spin-welding.

16. The bottle of claim 11, wherein said handle has a length which is slightly greater than the length of the opening of said recess so that pressure is applied to said handle when its ends are in contact with and are secured to said attachment means, to thereby provide a curved handle.

17. The bottle of claim 11, wherein said attachment means includes opposing circular slots with accesses, each of which has a breadth that is less than the diameter of said contiguous slot, and wherein said handle is tubular with ends that are press-fitted through said accesses into locking engagement with the walls of said slots.

18. The bottle of claim 11, wherein said attachment means includes opposing projections, and wherein said handle includes resilient gripping means on the ends which temporarily open to grip and lock and handle onto said projections.

19. The bottle of claim 11, wherein said attachment means include keys, and wherein said handle includes lateral extensions at the ends thereof which have slots for engaging said keys to lock said handle thereto.

20. The bottle of claim 11, wherein said handle is resilient and is maintained under compression for constantly urging its means into engagement with said attachment means.

21. The bottle of claim 11, wherein said recess is positioned in the middle portion of said sidewall and has a longitudinal axis which is substantially parallel to the longitudinal axis of said bottle.

22. The bottle of claim 11, wherein said recess is located in the upper portion of said bottle at an acute angle to the longitudinal axis thereof.

23. The bottle of claim 11, wherein said recess has a concave shape in the vertical and horizontal planes for greater bottle capacity.

24. The bottle of claim 11, wherein said attachment means include openings therethrough, and wherein said handle is secured to said attachment means and about said openings, to thereby provide a bottle with a flow through handle.

25. The bottle according to claim 11, wherein said handle has means therein for deflecting the handle inwardly incident to attachment thereof to said bottle.

26. The bottle according to claim 25, wherein said deflection means in said handle is a notch in the central portion of its outer wall which provides maximum flexibility of the central portion thereof inwardly while providing maximum rigidity outwardly for gripping, lifting, carrying and pouring when said handle is secured to said bottle.

27. The bottle of claim 11, wherein said handle is maintained under compression for constantly urging said handle attachment means into engagement with said bottle attachment means.

28. A bottle having a neck finish at one end, a base at its other end, and a sidewall therebetween, comprising:

a recess in said sidewall being open, and having a back wall and upper and lower walls forming a finger placement space therebetween, a handle adapted to be secured to said bottle at said recess opening and substantially within said recess and about which finger placement can occur within said recess for gripping said handle, flexible means in said bottle sidewall adjacent to said recess adapted to allow outward deflection thereof for accommodating said handle when it is secured to said bottle, and interlocking means on said bottle and said handle for securing the handle to said bottle which includes horizontal and vertical bearing surfaces that coact and allow the bottle to be lifted, carried and poured from by gripping said handle.

29. The bottle of claim 28, wherein said flexible means constantly urges said interlocking means together once said handle is secured to the bottle.

30. The bottle of claim 28, wherein said flexible means is a pleat.

31. The bottle of claim 30, wherein said pleat is triangular in cross section with its wider end adjacent the recess opening and its apex end adjacment said back wall of said recess.

32. The bottle according to claim 28, wherein said flexible means are bellows.

33. The bottle according to claim 32, wherein said bellows are positioned immediately above and below said upper and lower walls of said recess.

34. A bottle having a neck at one end, a base at its other end and a sidewall therebetween, comprising:

a recess in said sidewall being open at said sidewall, and having a back wall, and upper and lower walls which form a space for finger placement through said opening, attachment means on said upper and lower recess walls, a handle positioned essentially within the breadth of the bottle and about which finger placement can occur within said recess for gripping the handle, said handle including attachment means which coact with said attachment means on said upper and lower recess walls to secure said handle to said bottle and being of a slightly greater length than the length of the opening at said recess attachment means, and wherein said attachment means on said recess walls and handle have contacting horizontal and vertical bearing surfaces therebetween which allow the bottle to be lifted, carried and poured from by gripping said handle.

35. A bottle having a neck at one end, a base at its other end and a sidewall therebetween, comprising:

a recess in said sidewall being open at said sidewall, and having a back wall, and upper and lower walls which form a space for finger placement through said opening, a handle adapted to be secured to said bottle at said recess opening and essentially within the breadth of the bottle, and about which finger placement can occur within said recess for gripping the handle, said sidewall of the bottle being resilient adjacent to said recess for allowing outward deflection thereof to accommodate said handle when it is secured to the bottle, and attachment means on said bottle and handle for securing said handle to the bottle which includes horizontal and vertical bearing surfaces that coact and allow the bottle to be lifted, carried and poured from by gripping said handle.

* * * * *